(12) United States Patent
Yonge, III et al.

(10) Patent No.: US 8,112,358 B2
(45) Date of Patent: Feb. 7, 2012

(54) AUTHORIZING CUSTOMER PREMISE EQUIPMENT ON A SUB-NETWORK

(75) Inventors: Lawrence W. Yonge, III, Ocala, FL (US); Srinivas Katar, Gainesville, FL (US); Manjunath Krishnam, Gainesville, FL (US)

(73) Assignee: Qualcomm Atheros, Inc., San Jose, CA (US)

( * ) Notice: Subject to any disclaimer, the term of this patent is extended or adjusted under 35 U.S.C. 154(b) by 834 days.

(21) Appl. No.: 11/970,323

(22) Filed: Jan. 7, 2008

(65) Prior Publication Data

US 2008/0301052 A1 Dec. 4, 2008

Related U.S. Application Data

(60) Provisional application No. 60/941,949, filed on Jun. 4, 2007.

(51) Int. Cl.
*G06F 21/00* (2006.01)
(52) U.S. Cl. ........................................... 705/50
(58) Field of Classification Search .................. 713/163; 705/59
See application file for complete search history.

(56) References Cited

U.S. PATENT DOCUMENTS

| | | | |
|---|---|---|---|
| 4,578,530 A | 3/1986 | Zeidler | |
| 6,167,137 A | 12/2000 | Marino et al. | |
| 6,173,400 B1 | 1/2001 | Perlman et al. | |
| 6,269,163 B1 | 7/2001 | Rivest et al. | |
| 6,307,940 B1 | 10/2001 | Yamamoto | |
| 6,775,656 B1 | 8/2004 | Gettwart et al. | |
| 6,910,136 B1 | 6/2005 | Wasserman et al. | |
| 7,039,021 B1 | 5/2006 | Kokudo | |
| 7,181,620 B1 | 2/2007 | Hur | |
| 7,234,058 B1 | 6/2007 | Baugher et al. | |
| 7,350,076 B1 | 3/2008 | Young et al. | |
| 7,409,543 B1 | 8/2008 | Bjorn | |
| 7,797,751 B1 | 9/2010 | Hughes et al. | |
| 7,826,618 B2 | 11/2010 | Klingler et al. | |
| 2001/0000709 A1 | 5/2001 | Takahashi et al. | |
| 2002/0015496 A1 | 2/2002 | Weaver et al. | |
| 2002/0029260 A1 | 3/2002 | Dobbins et al. | |
| 2002/0124177 A1 | 9/2002 | Harper et al. | |
| 2003/0048183 A1 | 3/2003 | Vollmer et al. | |
| 2003/0137993 A1 | 7/2003 | Odman | |
| 2003/0224784 A1 | 12/2003 | Hunt et al. | |
| 2004/0165532 A1 | 8/2004 | Poor et al. | |
| 2004/0210630 A1 | 10/2004 | Simonnet et al. | |
| 2004/0234073 A1 | 11/2004 | Sato et al. | |
| 2005/0001694 A1 | 1/2005 | Berkman | |
| 2005/0021539 A1 | 1/2005 | Short et al. | |
| 2005/0071631 A1 | 3/2005 | Langer | |
| 2005/0190785 A1 | 9/2005 | Yonge, III et al. | |
| 2006/0159260 A1 | 7/2006 | Pereira et al. | |
| 2006/0168647 A1 | 7/2006 | Chiloyan, II | |
| 2007/0025391 A1 | 2/2007 | Yonge, III et al. | |
| 2007/0053520 A1 | 3/2007 | Eckleder | |
| 2009/0106551 A1 | 4/2009 | Boren et al. | |
| 2010/0100724 A1 | 4/2010 | Kaliski, Jr. | |

FOREIGN PATENT DOCUMENTS

EP 1748597 A1 1/2007

*Primary Examiner* — Calvin L Hewitt, II
*Assistant Examiner* — Khalif Muhammad (57) ABSTRACT

Systems and methods for authorizing a customer premise equipment (CPE) device to join a network through a network termination unit (NTU). The CPE device can send an encrypted connection request, and an authorization server can decrypt the connection request and provide a network membership key (NMK) associated with the CPE device to the NTU. The authorization server can encrypt the NMK associated with the CPE device using a device access key (DAK) associated with the NTU.

15 Claims, 8 Drawing Sheets

AUTHORIZING CUSTOMER PREMISE EQUIPMENT ON A SUB-NETWORK

RELATED APPLICATIONS

This application is a utility of U.S. Provisional Application Ser. No. 60/941,949, entitled "MANAGING COMMUNICATIONS OVER A SHARED MEDIUM," filed on Jun. 4, 2007, which is hereby incorporated by reference.

TECHNICAL FIELD

The invention relates to managing secured communications over a shared medium.

BACKGROUND

A network of communication stations can share a communication medium (e.g., wires connecting multiple stations or spectrum for transmitting radio signals among stations) using any of a variety of access techniques. Security for a shared communication medium network can be difficult since there is no protection from others connecting unauthorized devices to the network. For example, when a new customer premise equipment (CPE) device subscribes, the new CPE device should be able to easily join the network, while unauthorized CPEs should be inhibited from joining the network. While an encryption key can provide some security, the distribution of the encryption key can be difficult because communication of the keys can provide opportunity to compromise the encryption key.

SUMMARY

The following are various aspects described herein. In one aspect computer implemented authentication methods are disclosed. Such method can include: receiving an encrypted connection request from a customer premise equipment device at a network termination unit, the encrypted connection request being encrypted using a network membership key; forwarding the encrypted connection request to an authorization server; receiving an encrypted network membership key from the authorization server, the encrypted network membership key being encrypted using a device access key associated with the network termination unit; decrypting the encrypted network membership key using the device access key; and, authorizing the customer premise equipment device to join a subnet associated with the network termination unit.

Other methods can include: receiving a forwarded connection request, the forwarded connection request comprising an encrypted connection request received by a network termination unit forwarded to an authorization server; inspecting a first unique identifier associated with the forwarded connection request; identifying a network membership key associated with the first unique identifier; authenticating the forwarded connection request based on the identified network membership key; encrypting the network membership key using a device access key associated with the network termination unit; and, communicating the encrypted network membership key to the network termination unit.

Systems can include a network termination unit and an authorization server. The network termination unit can receive an encrypted connection request from a customer premise equipment device and forward the encrypted connection request if the network termination unit determines that the customer premise equipment device is not associated with the network termination unit. The authorization server can receive the encrypted connection request from the network termination unit and can decrypted the encrypted connection request based on a unique identifier, the unique identifier being associated with the customer premise equipment device. The authorization server can also provide a network membership key associated with the first unique identifier address based on decrypting the encrypted connection request.

Other aspects will be found in the detailed description, drawings and claims.

DETAILED DESCRIPTION

There are a many possible implementations of the invention, some example implementations are described below. However, such examples are descriptions of various implementations, and not descriptions of the invention, which is not limited to the detailed implementations described in this section but is described in broader terms in the claims.

Figure 1:
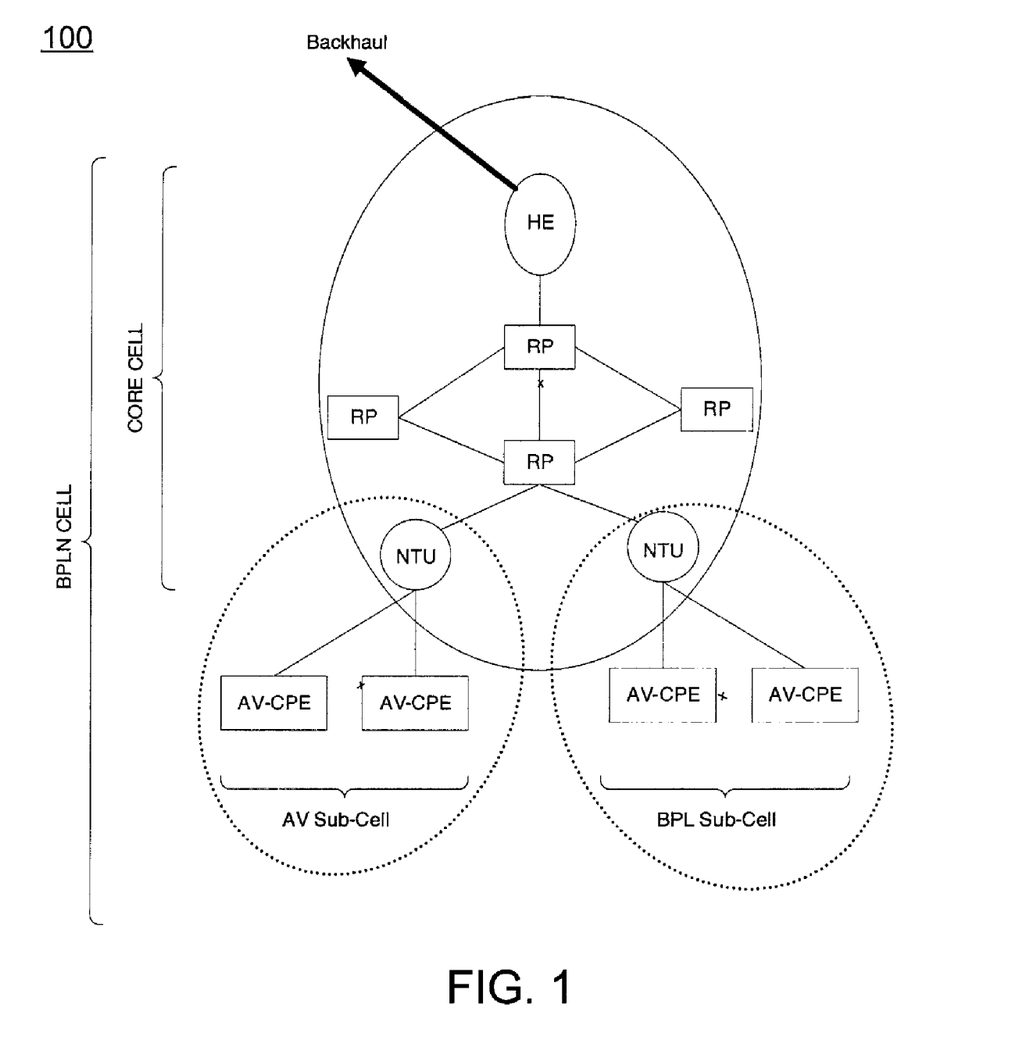
FIG. 1 is a schematic diagram of a communication network.

FIG. 1 shows an exemplary network configuration for an access network 100 such as a broadband power line Network (BPLN) that provides access to a backhaul network. The BPLN can be managed by a service provider entity having access to the underlying physical power line medium. BPLN is a general purpose network that can be used for several types of applications including, smart grid management, broadband internet access, voice and video delivery services, etc. In various implementations, BPLN can be deployed on low voltage, medium voltage and high voltage power lines. Additionally, BPLN can span an entire neighborhood or it may be deployed within a single multi-dwelling unit. For example, it can be used to provide network service to tenants in a single apartment building. While power lines are one medium for deploying the BPLN, similar techniques can be deployed on other wire lines, such as, for example, coaxial cables, twisted pair or a combination thereof.

A BPLN can include one or more cells. A cell is a group of broadband power line (BPL) devices in a BPLN that have similar characteristics such as association management, security, QoS and channel access settings, for example. Cells in a BPLN are logically isolated from each other, and communication to and from the backhaul occurs within the cell. Each cell in a BPLN includes a core-cell and may also include one or more sub-cells. There can be more than one cell on a given physical power line medium.

A core-cell includes a group of devices in a BPLN that includes a head end (HE), repeaters (R), and network termination units (NTU), but can exclude customer premise equipment (CPE). The head end (HE) is a device that bridges a cell to the backhaul network. At a given time, a cell will have one active head end and the head end manages the cell including the core-cell and any associated sub-cells. A repeater (RP) is a device that selectively retransmits media access control (MAC) service data units (MSDUs) to extend the effective range and bandwidth of the BPLN cell. Repeaters can also perform routing and quality of service (QoS) functions. The NTU is a device that connects a BPLN cell to the end users' network or devices. The NTU may in some cases bridge to other network technologies such as WiFi. A single NTU can serve more than one customer. Each Sub-Cell is associated with an active NTU. In some implementations, an HE, an NTU and/or an RP can be co-located at a single station. Thus, a single device may be designed to perform multiple functions. For example, a single device can simultaneously be programmed to perform the tasks associated with an RP and an NTU.

Various types of CPE devices (e.g., a computer) can be used as endpoint nodes in the network and such devices can communicate with other nodes in the network through the NTU.

Various types of CPE devices (e.g., a computer) can be used as endpoint nodes in the network and such devices can communicate with other nodes in the network through the NTU, any number of repeaters (e.g., including no repeaters), and the head end.

Each node in the network communicates as a communication "station" (STA) using a PHY layer protocol that is used by the nodes to send transmissions to any other stations that are close enough to successfully receive the transmissions. STAs that cannot directly communicate with each other use one or more repeater STAs to communicate with each other. Any of a variety of communication system architectures can be used to implement the portion of the network interface module that converts data to and from a signal waveform that is transmitted over the communication medium. An application running on a station can provide data to and receives data from the network interface module. A MSDU is a segment of information received by the MAC layer. The MAC layer can process the received MSDUs and prepares them to generate "MAC protocol data units" (MPDUs). A MPDU is a segment of information including header and payload fields that the MAC layer has asked the PHY layer to transport. An MPDU can have any of a variety of formats based on the type of data being transmitted. A "PHY protocol data unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the powerline medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques like Orthogonal Frequency Division Multiplexing (OFDM), Wavelet modulations can be used. Forward error correction (FEC) code line Viterbi codes, Reed-Solomon codes, concatenated code, turbo codes, low density parity check code, etc., can be employed by the PHY to overcome errors. A preferred implementation of the MAC and PHY layers used by powerline medium is that based on HomePlug AV specification.

One implementation of the PHY layers is to use OFDM modulation. In OFDM modulation, data are transmitted in the form of OFDM "symbols." Each symbol has a predetermined time duration or symbol time Ts. Each symbol is generated from a superposition of N sinusoidal carrier waveforms that are orthogonal to each other and form the OFDM carriers. Each carrier has a peak frequency fi and a phase $\Phi_i$ measured from the beginning of the symbol. For each of these mutually orthogonal carriers, a whole number of periods of the sinusoidal waveform is contained within the symbol time Ts. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies f1 and fN referred to as the OFDM bandwidth.

Figure 2:
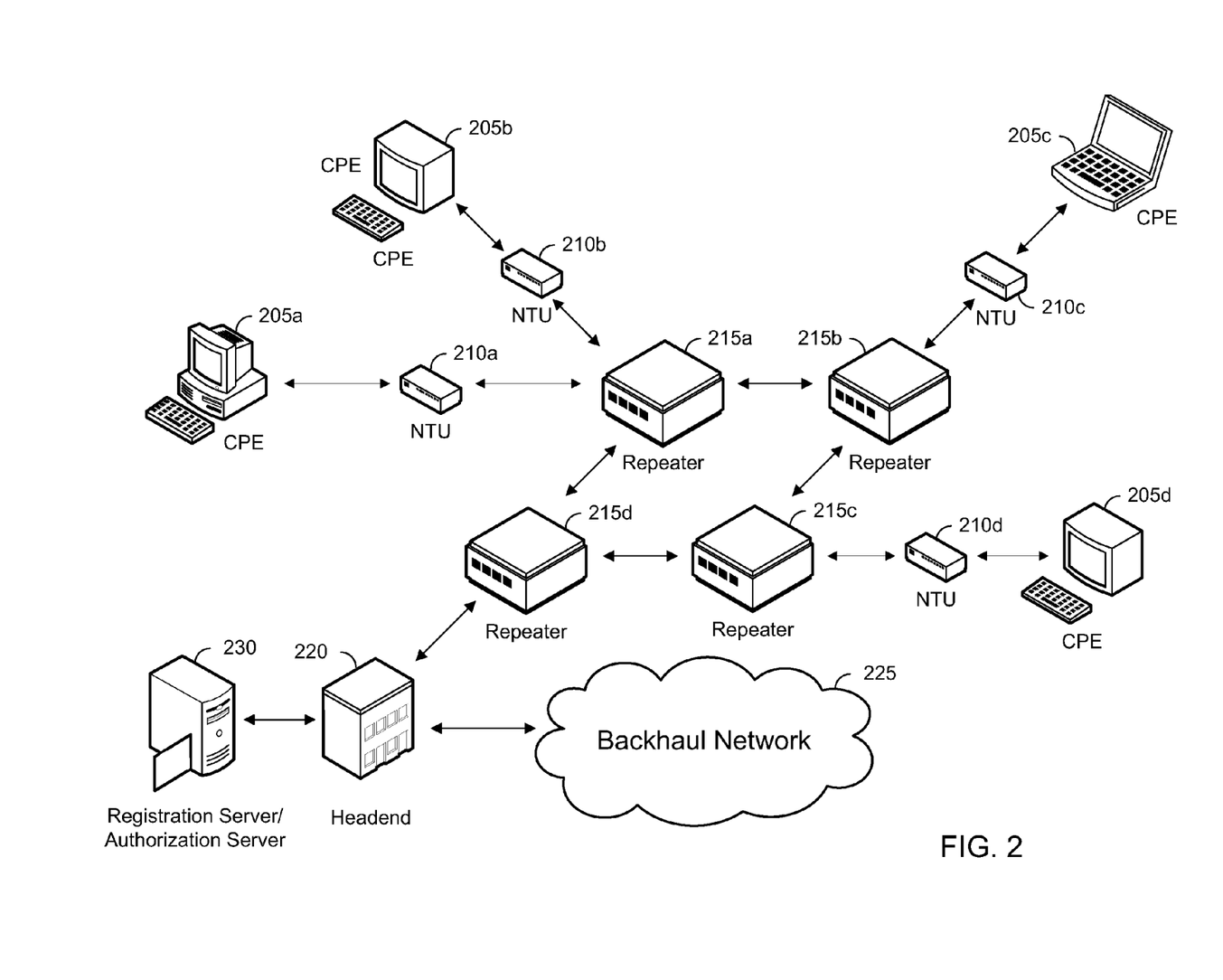
FIG. 2 is a block diagram of a powerline communication network.

FIG. 2 is a block diagram of a powerline communication network. In various implementations, a powerline communication network can enable customer premises equipment (CPE) devices 205*a-d* to access a backhaul network 210 through a gateway (e.g., a headend 215). In various implementations, there can be multiple gateways to the backhaul network 210. For example, it can be inefficient for a CPE device in one city to be required to send a signal to another city prior to accessing the backhaul network 210 (e.g., the Internet).

The CPE devices 205*a-d* can communicate with the headend 215 through a network of network termination units 220*a-d* and repeaters 225*a-d*. In some implementations, the network termination units can operate to translate the data signals from the CPE devices in any of a variety of communications protocols onto a powerline network. For example, a CPE 205*a-d* might communicate with an NTU 220*a-d* using a IEEE 802.11 wireless protocol, and the NTU 220*a-d* can convert the wireless signal to a signal suitable for transmission on a powerline medium. Systems for transmitting and receiving powerline network signals are further described in FIG. 3.

In various implementations, repeaters 225*a-d* can be located throughout the powerline network to provide the ability for a data signal to travel on the powerline carrier medium over long distances. As discussed above, the headend 215 can provide a gateway for the data signal to be transferred to a backhaul network 210. For example, the headend 215 can extract the data signal from the powerline network and convert the signal for transmission on a packet switched network such as the Internet. In various implementations, one or more of the repeaters 225*a-d* can be equipped to transfer the signal from the powerline network to the backhaul network 210.

In some implementations, the headend 215 can also include an authorization server. In one implementation, the authorization server is included on the backhaul network 210. The authorization server can be operable to authorize CPE devices 205*a-d* for transmission of data over the powerline network. When a CPE device 205*a-d* is not authorized, in various implementations, the CPE device 205*a-d* can be provided access to a registration server 230. The registration server 230, in various implementations, can enable the user of a CPE device 205*a-d* to register the CPE device 205*a-d* with the network to obtain access to the powerline network.

In various implementations, the registration server 230 can provide a limited registration to a CPE device 205a-d to try the powerline network. For example, the registration can be limited by a period of time, bandwidth, destination address, or any other limitation that might allow the user to have limited access to the network. In additional implementations, the registration server 230 can require payment prior to using the network. For example, the registration server can provide web pages operable to collect payment information from the user. In various implementations, the registration server can allow the user to pay for any of a variety of different access plans. For example, an access plan might allow a user to purchase access for a specified period of time, at a specified bandwidth, or combinations thereof. In some implementations, the registration server and authorization server can be co-located as shown in FIG. 2. In additional implementations, the registration server can be part of the backhaul network 201. In still further implementations, the registration server is not co-located with the authorization server.

Figure 3:
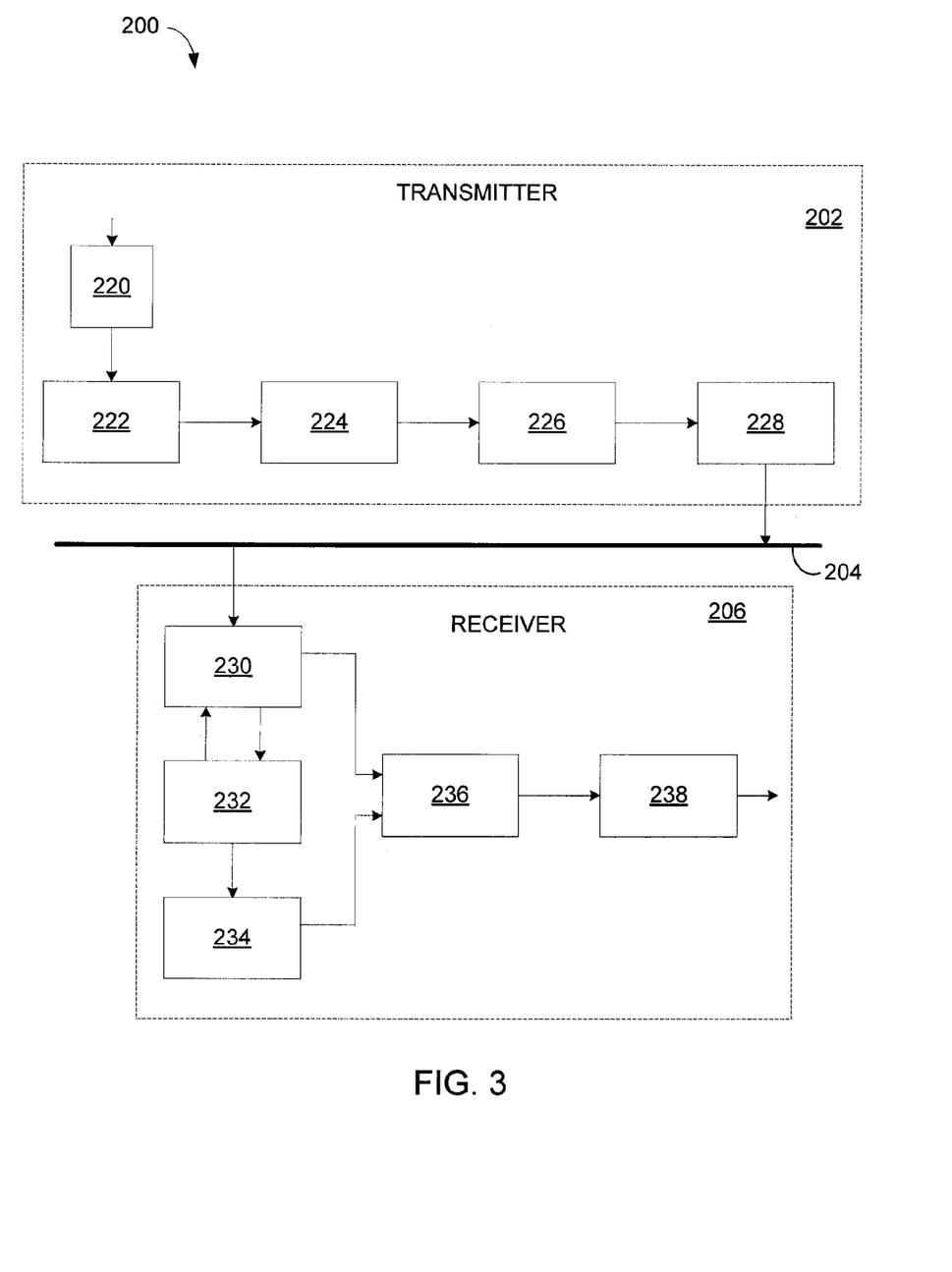
FIG. 3 is a block diagram of a communication system for communicating over a powerline network.

Referring to FIG. 3, a communication system 300 includes a transmitter 302 for transmitting a signal (e.g., a sequence of OFDM symbols) over a communication medium 304 to a receiver 306. The transmitter 302 and receiver 306 can both be incorporated into a network interface module at each station. The communication medium 304 can represent a path from one device to another over the power line network.

At the transmitter 302, modules implementing the PHY layer receive an MPDU from the MAC layer. The MPDU is sent to an encoder module 320 to perform processing such as scrambling, error correction coding and interleaving.

The encoded data is fed into a mapping module 322 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 322 also determines which of the carrier frequencies $f_1, \ldots, f_N$ within the OFDM bandwidth are used by the system 300 to transmit information. For example, some carriers that are experiencing fades can be avoided, and no information is transmitted on those carriers. Instead, the mapping module 322 uses coherent BPSK modulated with a binary value from the Pseudo Noise (PN) sequence for that carrier. For some carriers (e.g., a carrier i=10) that correspond to restricted bands (e.g., an amateur radio band) on a medium 304 that may radiate power no energy is transmitted on those carriers (e.g., $A_{10}=0$). The mapping module 322 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 324 performs the modulation of the resulting set of N complex numbers (some of which may be zero for unused carriers) determined by the mapping module 322 onto N orthogonal carrier waveforms having peak frequencies $f_1, \ldots, f_N$. The modulated carriers are combined by IDFT module 324 to form a discrete time symbol waveform S(n) (for a sampling rate $f_R$), which can be written as $$S(n) = \sum_{i=1}^{N} A_i \exp[j(2\pi i n/N + \Phi_i)] \quad \text{Eq. (1)}$$

where the time index n goes from 1 to N, Ai is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 326 combines a sequence of consecutive (potentially overlapping) symbols into a "symbol set" that can be transmitted as a continuous block over the communication medium 304. The post-processing module 326 prepends a preamble to the symbol set that can be used for automatic gain control (AGC) and symbol timing synchronization. To mitigate intersymbol and intercarrier interference (e.g., due to imperfections in the system 300 and/or the communication medium 304) the post-processing module 326 can extend each symbol with a cyclic prefix that is a copy of the last part of the symbol. The post-processing module 326 can also perform other functions such as applying a pulse shaping window to subsets of symbols within the symbol set (e.g., using a raised cosine window or other type of pulse shaping window) and overlapping the symbol subsets.

An analog front end (AFE) module 328 couples an analog signal containing a continuous-time (e.g., low-pass filtered) version of the symbol set to the communication medium 304. The effect of the transmission of the continuous-time version of the waveform S(t) over the communication medium 304 can be represented by convolution with a function $g(\tau; t)$ representing an impulse response of transmission over the communication medium. The communication medium 304 may add noise n(t), which may be random noise and/or narrowband noise emitted by a jammer.

At the receiver 306, modules implementing the PHY layer receive a signal from the communication medium 304 and generate an MPDU for the MAC layer. An AFE module 330 operates in conjunction with an automatic gain control (AGC) module 332 and a time synchronization module 334 to provide sampled signal data and timing information to a discrete Fourier transform (DFT) module 336.

After removing the cyclic prefix, the receiver 306 feeds the sampled discrete-time symbols into DFT module 336 to extract the sequence of N complex numbers representing the encoded data values (by performing an N-point DFT). Demodulator/Decoder module 338 maps the complex numbers onto the corresponding bit sequences and performs the appropriate decoding of the bits (including de-interleaving and descrambling).

Any of the modules of the communication system 300 including modules in the transmitter 302 or receiver 306 can be implemented in hardware, software, or a combination of hardware and software.

Figure 4:
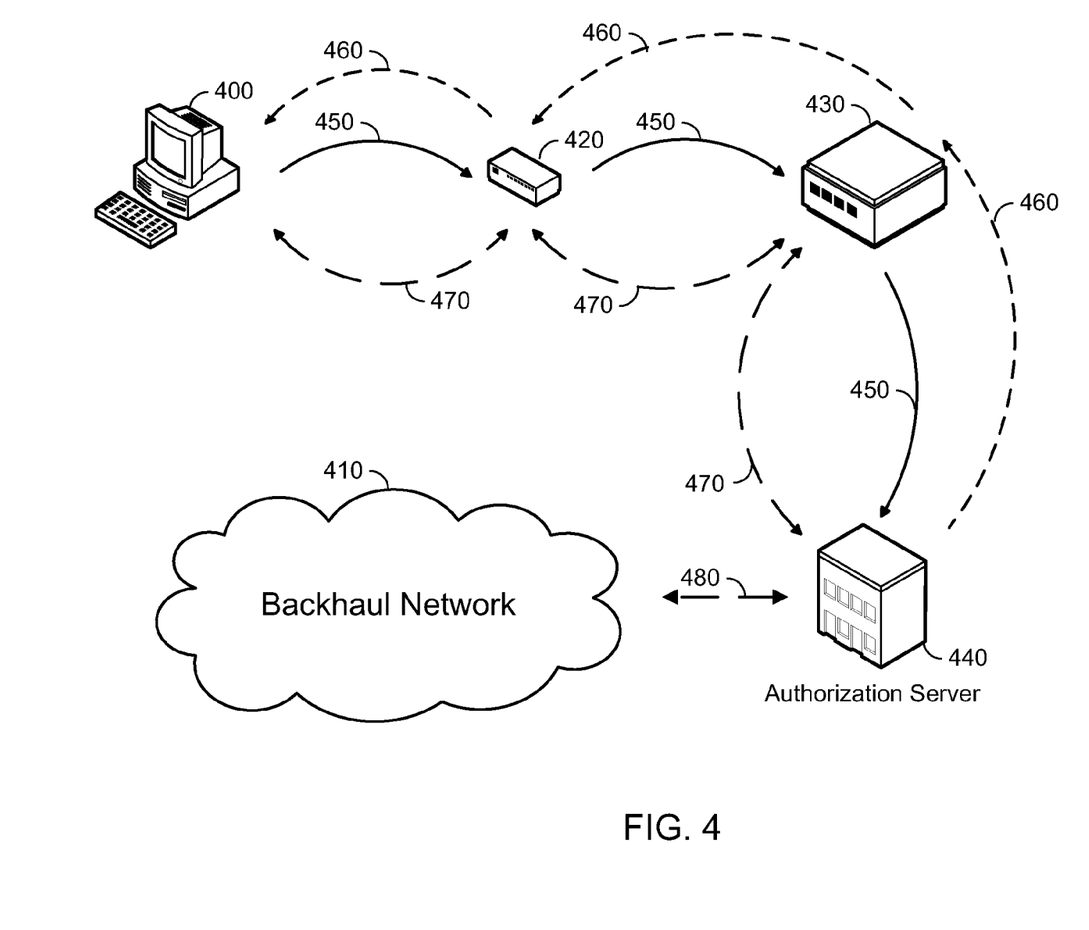
FIG. 4 is a block diagram illustrating a process for authorizing customer premise equipment device into a sub-network.

FIG. 4 is a block diagram illustrating a process for authorizing customer premise equipment (CPE) device into a subnetwork. In various implementations, a powerline network can enable a CPE device 400 to access a backhaul network 410 through a powerline network. The powerline network can include a network termination unit (NTU) 420, a repeater 430, an authorization server 440 which determines whether the CPE 400 can access the backhaul network 410.

In various implementations, CPE 400 can associate with the powerline network by sending a connection request 450 to the authorization server 440 through the NTU 420 and the repeater 430. The connection request 450, in some implementations, can include a request for a network encryption key (NEK). The connection request 450 can be encrypted by the CPE 400 using a network membership key (NMK) associated with the CPE 400.

In some implementations, the authorization server 440 can decrypt the connection request 450 using the NMK associated with the CPE 400. The authorization server 440 can identify the NMK associated with the CPE 400 by extracting an identifier (e.g., a media access control (MAC) address) associated with the connection request 450. Once the NMK has been identified, the authorization server can decrypt the connection request 450 to determine that the CPE device is requesting an NEK to connect to the network. The authorization server 440 can authorize the CPE device 400 based upon being able to decrypt the connection request 450.

The authentication server 440 can respond to the NTU 420 by encrypting the NMK associated with the CPE device 400 using a device access key (DAK) associated with the NTU 420, as shown by signal 460. The NTU 420 can decrypt the communication from the authorization server 440 by using its own DAK. The NTU can then encrypt an NEK using the NMK associated with the new CPE device 400 received from the authorization server 440, as further shown by signal 460.

When the CPE device 400 receives the encrypted NEK from the NTU 420, the CPE device 400 can decrypt the NEK using its own NMK. The CPE device 400 can be joined to the network and enabled to communicate with the network devices (e.g., NTU 420, repeater 430, and authentication server 440) as shown by signal 470. The CPE device 400 can also communicate with the backhaul network 410 (e.g., external network).

In some implementations, the CPE communicates to the authorization server through NTUs, repeaters and a headend (i.e., a gateway device to the backhaul network). For example, in FIG. 2 the CPE 205a can communicate with the authorization server 230 through NTU 210a, repeaters 215a, 215d and headend 220. In such implementations, the headend 230 can relay the connection request from the CPE 205a to the authorization server 230. The headend can further relay the response from the authentication server to the NTU. In various implementations, the authorization server 230 can inform the headend 220 that the CPE 205a is authorized to access the backhaul network along with the information on the service level that are guaranteed for the CPE 205a. The service level information can include, for example, the maximum uplink and maximum down link bandwidths that were guaranteed to the CPE, the number of VoIP number and/or type of connections the CPE can make, etc. The headend can use this information to restrict the CPE from accessing the backhaul network. In various implementations, the authorization server 230 can itself be part of the backhaul network.

Figure 5:
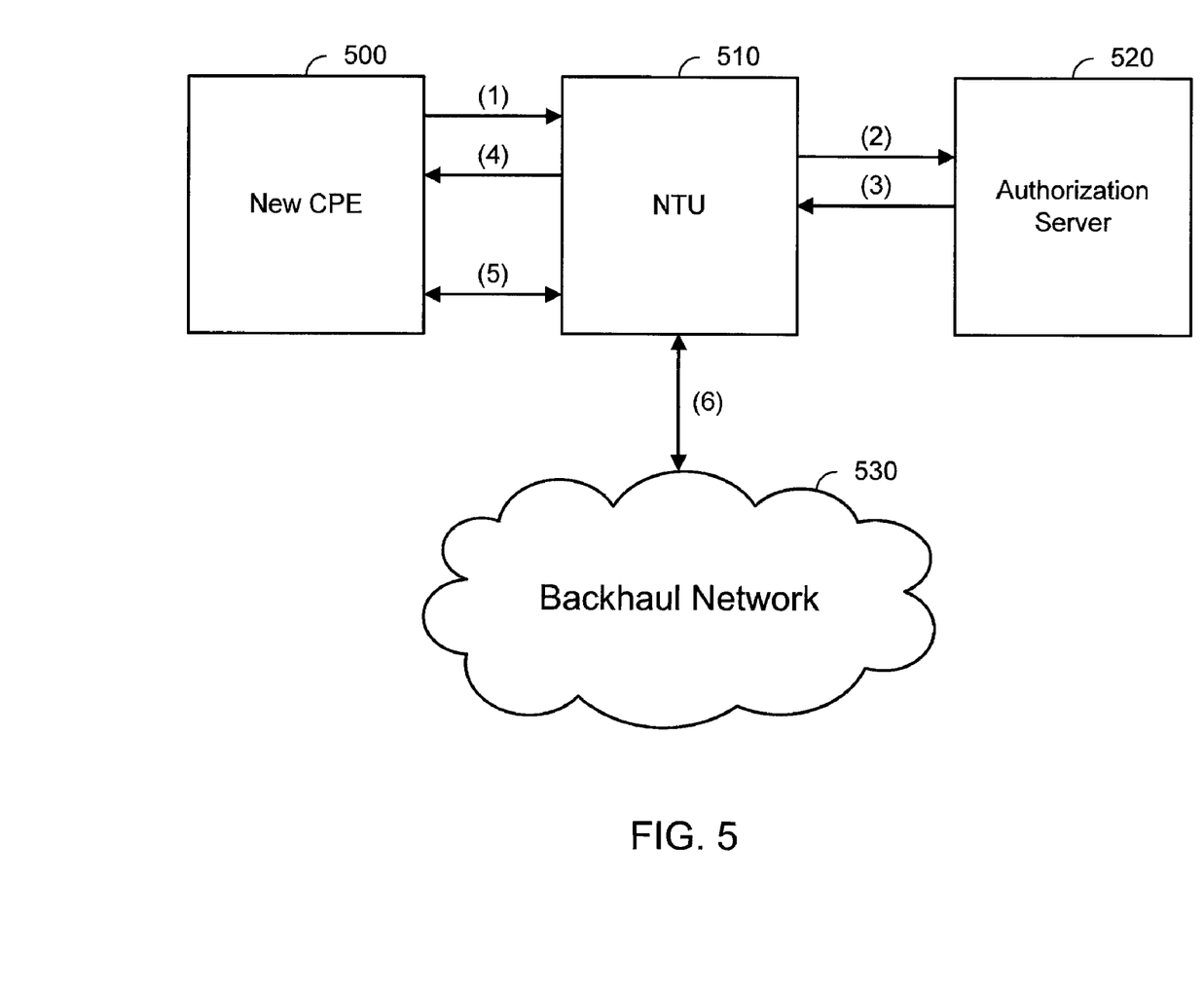
FIG. 5 is a block diagram illustrating the communication flow associated with authorizing a customer premise equipment device into a sub-network.

FIG. 5 is a block diagram illustrating the communication flow associated with authorizing a customer premise equipment (CPE) device 500 into a sub-network. The CPE device 500 can send a connection request to an associated network termination unit (NTU) 510 as shown by signal (1). The connection request can include a request for a network encryption key (NEK) to join a sub-net associated with the NTU 510. In various implementations, the connection request can be encrypted using a network membership key (NMK) associated with the CPE device 500. Because the CPE device 500 was not previously associated with the NTU 510, the NTU 510 cannot decrypt the encrypted connection request.

The NTU 510 can forward the connection request to an authorization server 520 as shown by signal (2). The authorization server 520 can extract an identifier associated with a device originating the connection request (e.g., a media access control (MAC) address associated with the CPE device 500). Based upon the extracted identifier, the authorization server 520 can identify an NMK associated with the CPE device 500. The authorization server can then decrypt the connection request using the identified NMK associated with the identifier extracted from the connection request. The authorization server 520 can authorization the CPE device 500 based upon decryption of the connection request using the NMK associated with the extracted identifier.

The authorization server can then encrypt the NMK associated with the CPE device 500 using a device access key (DAK) associated with the NTU 510 that forwarded the connection request. The authorization server 520 can then send the encrypted NMK to the NTU 510 as shown by signal (3). The NTU 510 can decrypt the encrypted NMK received from the authorization server 520 using its own DAK.

The NTU 510 can then encrypt an NEK using the decrypted NMK associated with the new CPE device 500. The NTU 510 can then send the encrypted NEK to the CPE device 500 as shown by signal (4). The CPE device 500 can then decrypt the encrypted NEK using its NMK. The decrypted NEK can thereafter be used to encrypt communications sent to the NTU 510 as shown by signal (5). The CPE device 500 can also use the NEK to communicate with other network devices and to send/receive information to/from a backhaul network 530 (e.g., the Internet) through the NTU 510 as shown by signal (6).

Figure 6:
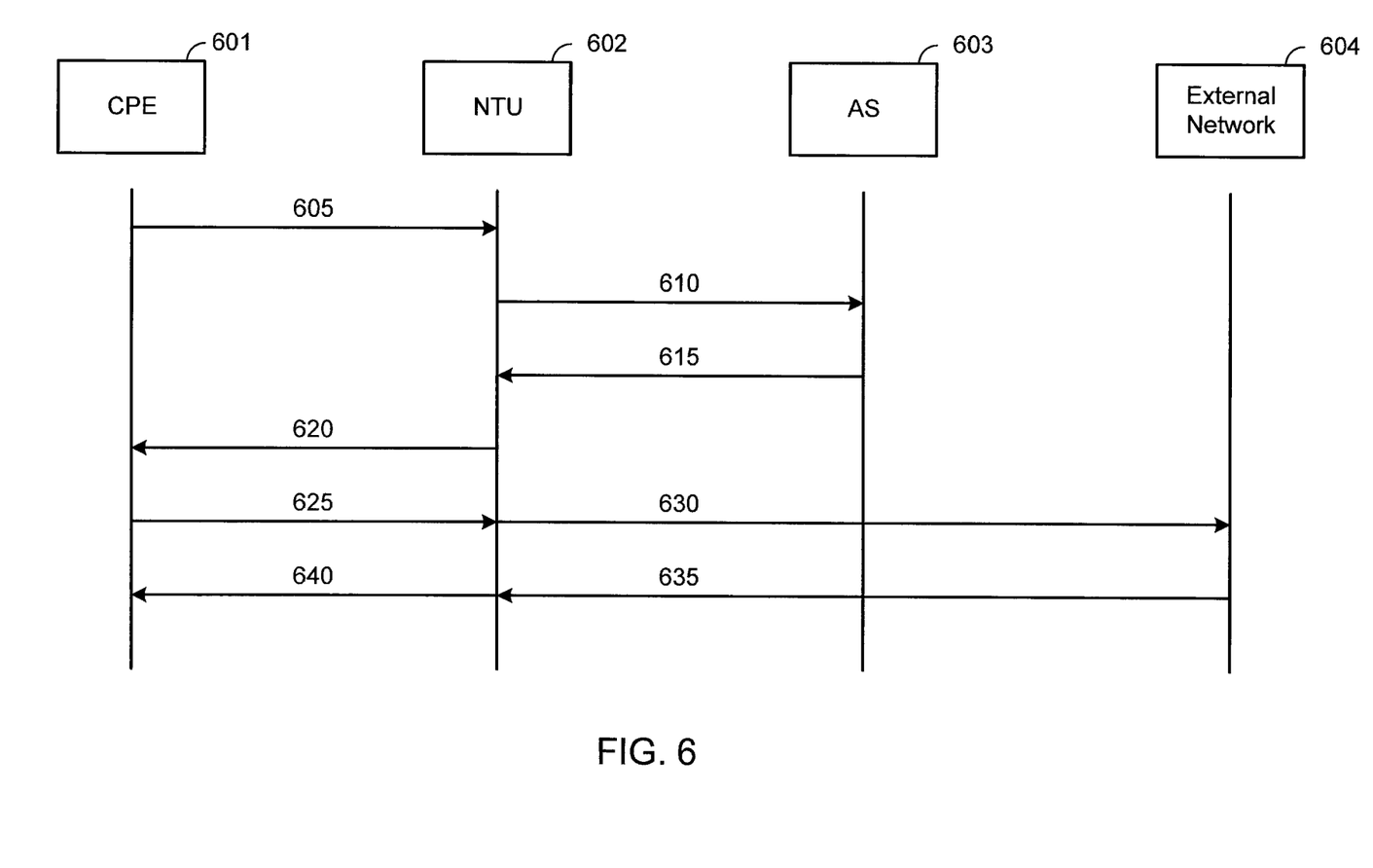
FIG. 6 is a flow diagram depicting an example flow for authorization of a customer premise equipment device into a sub-network.

FIG. 6 is a flow diagram depicting an example flow for joining a CPE device 601 into a sub-cell (e.g., a sub-net). In some implementations, registered CPE devices 601 can access the network from a variety of locations. The variety in locations, for example, can be caused by relocating, can be caused by the user taking his or her laptop from home to the office, etc. In such implementations, the CPE device already includes a unique NMK.

However, when the CPE device 601 attempts to join a new NTU 602 by requesting a unique NEK encrypted using the unique NMK as shown by signal 605, the new NTU 602 does not recognize the encrypted NEK request. The request for a unique NEK, in some implementations, can include a unique identifier (e.g., a MAC address) associated with the NTU 602 from which the NEK is requested.

The NTU 602 forwards the encrypted NEK request to an authorization server 603 as shown by signal 610. The authorization server 603 can parse the forwarded request to locate a unique identifier (e.g., a MAC address) associated with the CPE device 601. Once the unique identifier has been located, the authorization server 603 can query a data store to determine a unique NMK associated with the unique identifier. The unique NMK can be used to decrypt the NEK request. In some implementations, a unique identifier associated with the encrypted portion of the NEK request can be matched to the NTU 602 from which the NEK request was forwarded to determine authenticity of the request.

The authorization server 603 can then encrypt the NMK of the CPE device 601 using a DAK associated with the NTU 602 as shown by signal 615. The NTU 602 can thereby decrypt the NMK associated with the requesting CPE device 601 using its DAK. The NMK associated with the CPE device 601 can be used to encrypt the NEK. The NTU 602 can communicate the encrypted NEK to the CPE device 601 as shown by signal 620.

The CPE device 601 can decrypt the NEK using its NMK. The CPE device 601 can then send information to an external network 604 through the NTU 602 using the NEK to encrypt the transmissions, as shown by signals 625, 630. The CPE device 601 can also receive information from the external network 604 through the NTU 602 as shown by signals 635 and 640, the signals 625, 640 between the NTU 602 and the CPE device 601 being encrypted using the NEK to provide security between the CPE device 601 and the NTU 602. In some implementations, the NEK used between the CPE device 601 and the NTU 602 is a unique NEK within the sub-cell (e.g., sub-net) associated with a particular NTU 602.

Figure 7:
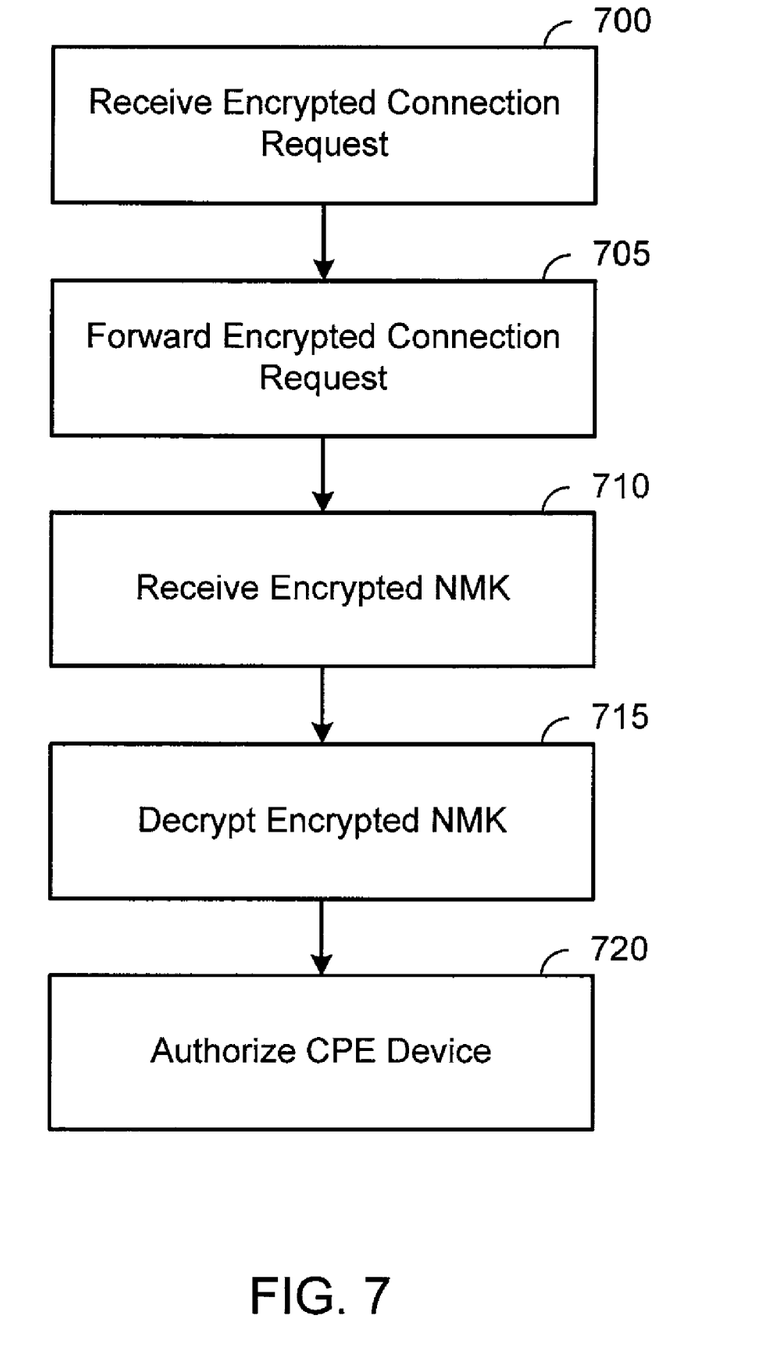
FIGS. 7 and 8 are flowcharts illustrating example methods for authorizing a customer premise equipment device into a sub-network.

FIG. 7 is a flowchart illustrating an example method to request connection to a sub-cell (e.g., sub-net). At stage 700, an encrypted connection request is received. The encrypted connection request can be received, for example, by an NTU (e.g., NTU of FIG. 1). In some implementations, the connection request can be encrypted by a CPE device using a unique NMK associated with the CPE device. The encrypted connection request cannot be decrypted by the NTU, because the NTU does not possess the NMK associated with the CPE device.

At stage 705, an encrypted connection request can be forwarded. In various embodiments, the encrypted connection request can be forwarded, for example, by an NTU (e.g., NTU 420 of FIG. 4). The encrypted connection request can be forwarded to an authorization server (e.g., authorization server 603 of FIG. 6).

At stage 710, the encrypted NMK can be received. The encrypted NMK can be received, for example, by an NTU (e.g., NTU 420 of FIG. 4). The NMK is encrypted using the DAK associated with the NTU. The NTU has knowledge of its own DAK and is therefore able to decrypt the encrypted NMK.

At stage 715, the encrypted NMK can be decrypted. The encrypted NMK can be decrypted, for example, by an NTU (e.g., NTU 420 of FIG. 4). The NMK is decrypted using the DAK associated with the NTU. The NTU has knowledge of its own DAK and is therefore able to decrypt the encrypted NMK.

At stage 720, the CPE device is authorized. The CPE device can be authorized, for example, by the NTU (e.g., NTU 420 of FIG. 4). The authorization can include communicating an NEK to the CPE device using the unique NMK associated with the CPE device. In other implementations, authorization can include joining the CPE device to the sub-cell.

Figure 8:
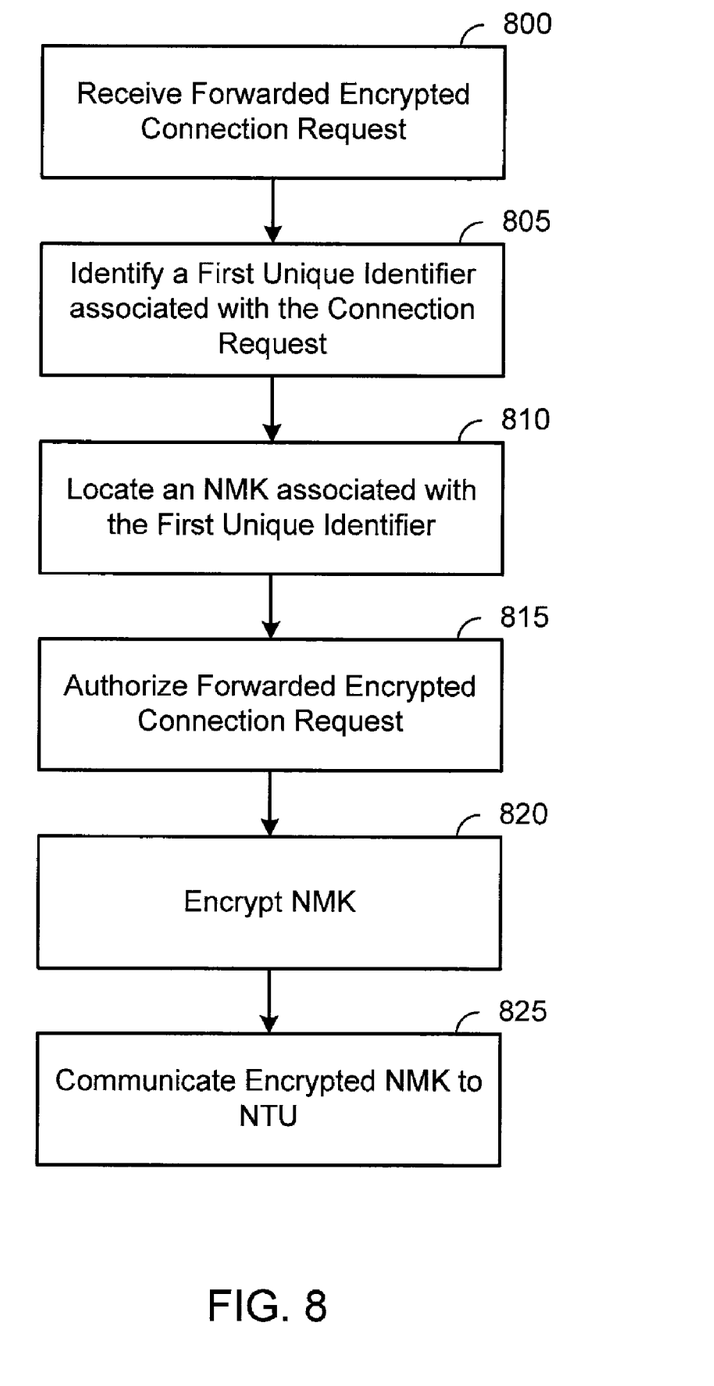

FIG. 8 is a flowchart illustrating an example method to authorize joining of a CPE device to a sub-cell. At stage 800, a forwarded encrypted connection request is received. The encrypted network connection request can be received, for example, by a authorization server (e.g., authorization server 440 of FIG. 4). In some implementations, the connection request is encrypted using the NMK associated with the CPE device requesting the connection.

At stage 805, a unique identifier associated with the connection request is identified. In various embodiments, the unique identifier can be identified, for example, by an authorization server (e.g., authorization server 440 of FIG. 4). In some implementations, the unique identification can include a MAC address associated with the CPE device requesting the connection, and can be transmitted without encryption.

At stage 810, an NMK associated with the first unique identifier is located. The NMK associated with the first unique identifier can be located, for example, by an authorization server (e.g., authorization server 420 of FIG. 4). In some implementations, the NMK associated with the first unique identifier can be located, for example, by querying a data store for an NMK associated with the first unique identifier.

At stage 815, the encrypted connection request can be authorized. The connection request can be authorized, for example, by the authorization server (e.g., authorization server 440 of FIG. 4). In some implementations, the connection request can be authorized by decrypting the connection request using the NMK associated with the first unique identifier. In some implementations, the connection request includes a second unique identifier within the encrypted portion of connection request. Based upon the second unique identifier matching an NTU unique identifier, the connection request can be authenticated.

At stage 820, the NMK is encrypted. The NMK can be encrypted, for example, by an authorization server (e.g., authorization server 440 of FIG. 4). In some implementations, the NMK can be encrypted using the DAK associated with the NTU. The DAK associated with the NTU can be retrieved from a data store including multiple DAKs, each of the DAKs being respectively associated with a unique identifier of an NTU.

At stage 825, the encrypted NMK is communicated to the NTU. The encrypted NMK can be communicated to the NTU, for example, by an authorization server (e.g., authorization server 440 of FIG. 4). In some implementations, the encrypted NMK can be encrypted using a DAK associated with the NTU. Thus, the NTU can decrypt the NMK using its DAK, and authorize the CPE device to join the sub-net.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

These and other implementations are within the scope of the following claims.

What is claimed is:

1. A computer implemented method comprising:
receiving an encrypted connection request from a customer premise equipment device at
a network termination unit, the encrypted connection request being encrypted using a network membership key;
forwarding the encrypted connection request to an authorization server; receiving, at a network termination unit, an encrypted network membership key from the authorization server, the encrypted network membership key being encrypted using a device access key associated with the network termination unit;
decrypting, by the network termination unit, the encrypted network membership key using the device access key; and
authorizing, by the network termination unit, the customer premise equipment device to join a subnet associated with the network termination unit.

2. The method of claim 1, wherein the encrypted connection request includes a first unique identifier associated with the network termination unit.

3. The method of claim 2, wherein the authorization server is operable to authorize the customer premise equipment based upon decryption of the encrypted connection request using a known network membership key associated with a second unique identifier associated with the customer premise equipment device.

4. The method of claim 3, wherein the authorization server is operable to determine whether the first unique identifier included in the encrypted connection request matches the network termination unit receiving the encrypted connection request.

5. The method of claim 1, wherein the network membership key comprises a unique network membership key.

6. The method of claim 1, further comprising providing by the network termination unit, a network encryption key to the customer premise equipment device.

7. A system comprising:
an authorization server computer; and
a network termination unit comprising:
A processor;
A computer readable storage media storing executable instructions that when executed by the processor causes the processor to perform the steps of:
receiving an encrypted connection request from a customer premise equipment device, the encrypted connection request being encrypted using a network membership key,
forwarding the encrypted connection request to the authorization server,
receiving an encrypted network membership key from the authorization server, the encrypted network membership key being encrypted using a device access key associated with the network termination unit;
decrypting the encrypted network membership key using the device access key, and authorizing the customer premise equipment device to join a subnet associated with the network termination unit.

8. The system of claim 7, wherein the authorization server is further operable to encrypt the network membership key prior to providing the network membership key to the network termination unit.

9. The system of claim 7, wherein the encrypted connection request includes a unique identifier, and the authorization server is operable to authorize the encrypted connection request based on whether an identifier associated with the network termination unit matches the unique identifier.

10. The system of claim 7, wherein the network termination unit is operable to provide a network encryption key to the customer premise equipment device based upon receipt of the network membership key.

11. The system of claim 10, wherein the network encryption key provided to the customer premise equipment device is encrypted using the network membership key obtained from the authorization server.

12. The method of claim 6, wherein the network encryption key is encrypted using the network membership key obtained from the authorization server.

13. The method of claim 1, further comprising:
determining, by the authorization server, whether a second unique identifier associated with the network termination unit is encrypted within the forwarded connection request.

14. The method of claim 1, wherein the network membership key comprises a unique network membership key associated with the customer premise equipment device.

15. The method of claim 6, wherein the network encryption key is unique to the customer premise equipment.

* * * * *